United States Patent [19]

Allen

[11] Patent Number: 5,276,074

[45] Date of Patent: *Jan. 4, 1994

[54] ENHANCED POLYMER CONCRETE COMPOSITION

[75] Inventor: William C. Allen, Pasadena, Calif.

[73] Assignee: Union Oil Company of California, Los Angeles, Calif.

[ * ] Notice: The portion of the term of this patent subsequent to Jun. 16, 2009 has been disclaimed.

[21] Appl. No.: 773,256

[22] Filed: Oct. 9, 1991

Related U.S. Application Data

[63] Continuation of Ser. No. 458,998, Dec. 29, 1989, Pat. No. 5,122,554.

[51] Int. Cl.$^5$ ............................................. C08K 3/00
[52] U.S. Cl. ......................................... 524/8; 524/650; 524/577; 524/578
[58] Field of Search ................................... 524/8, 650

[56] References Cited

U.S. PATENT DOCUMENTS

| | | | |
|---|---|---|---|
| 3,861,944 | 1/1975 | Steinberg et al. | 117/72 |
| 4,231,917 | 11/1980 | Zeldin et al. | 260/375 B |
| 4,500,674 | 2/1985 | Fontana et al. | 524/650 |
| 4,737,538 | 4/1988 | Halder et al. | 524/505 |
| 4,787,936 | 11/1988 | Suzuki et al. | 106/90 |

OTHER PUBLICATIONS

"Recommended Practice for Application of Cement Lining to Steel Tubular Goods, Handling, Installation and Joining", API PP 10E, American Petroleum Institute, Jul., 1987.

"Cement-Mortar Protective Lining and Coating for Steel Water Pipe-4 in. and Larger-Shop Applied", AWWA C205-85, American Water Works Association, 1985.

"Polymer Cement Geothermal Well-Completion Materials," UC 66c, Brookhaven National Laboratory, (BNL), Depart. of Energy, Jul., 1980.

"Plastic Porcelian No. 30", Product Information, Sauereisen Cements Company, 1982.

"Calcium-Aluminate Cements", Bulletin 1-01, Lehigh Cement Company.

Primary Examiner—Melvyn I. Marquis
Assistant Examiner—Mark Sweet
Attorney, Agent, or Firm—Gregory F. Wirzbicki; William O. Jacobson

[57] ABSTRACT

A polymer concrete pipe liner is formed from a fluidized, but substantially waterless cement containing mixture applied to the pipe interior. The mixture is composed of inorganic cement particles, a liquid styrene mixture and a minor amount of one or more polyolefinically unsaturated co-monomers. The mixture substantially excludes acrylonitrile and acrylamide. The co-monomers are preferably selected from a group including trimethylolpropane-trimethacrylate, divinyl benzene, hexadiene, and polyvinylsiloxanes. Mixing the liquid and solid components forms a slurry which is transferred to a pipe interior. Transfer properties can be controlled by particulate gradation, dissolved polymers, and rheology control additives. The pipe is then spun to centrifugally cast the liner. The composition avoids the need for high temperature curing and toxic reactive unsaturates to co-polymerize and cross-link polystyrene. Like the current polymer concrete materials, the materials embodied in the present invention have adequate strength at geothermal operating temperatures and reduced permeability, but they achieve this result without either a significant loss of broad spectrum chemical resistance to harsh geothermal environments or a large increase in cost. Other embodiments also incorporate the use of pozzolanic solids and high alumina cement to further improve chemical resistance characteristics.

41 Claims, 2 Drawing Sheets

ENHANCED POLYMER CONCRETE COMPOSITION

This application is a continuation, of application Ser. No. 07/458,998, filed Dec. 29, 1989 now U.S. Pat. No. 5,122,554.

FIELD OF THE INVENTION

This invention relates to cementitious compositions. More specifically, the invention is concerned with the compositions of waterless polymer concretes which can be used as linings for the interiors of piping systems handling harsh, high temperature fluids.

BACKGROUND OF THE INVENTION

Many piping system applications in chemical and natural resource recovery industries involve the handling of corrosive, erosive, scaling or otherwise harsh aqueous fluids. One economic approach to handling these difficult fluids is to spin cast a fluid-resistant liner onto the interior of a low cost, non-fluid-resistant pipe. The pipe material, such as low carbon steel, provides structural support for the costlier and/or structurally inadequate liner. One type of fluid-resistant liner is composed of an inorganic cementitious material, such as concretes containing Portland cement.

Common concrete lining materials are composed of a variety of inorganic non-metallic fillers and cements, forming a hydraulic slurry when mixed with water. The hydraulic slurry, which can temporarily flow like a liquid or plastic, is applied to the interior surfaces of the pipe and allowed to cure (slowly hydrate or precipitate) into a rigid pipe liner. Some water based hydratable cements (e.g., Portland cement) and concrete liners made from same are subject to chemical (e.g., corrosion) and mechanical (e.g., erosive) attack by certain harsh aqueous fluids, such as geothermal brines.

The primary objectives when creating new material components which can be used to fabricate a protective pipe liner are that the components: 1) produce a slurry which can be applied to the pipe interior; 2) harden into a liner which is attached to and moves with the pipe; and 3) resist long term fluid chemical and mechanical attack. The lined pipe should also be rugged, safe, reliable, environmentally acceptable, and low in cost.

Current cements and/or concretes used to line pipe may perform some of these objectives well in some applications, but may not be suitable for other applications. For example, a current American Petroleum Institute practice (API Recommended Practice 10E) recommends a high sulfate resistant hydraulic (water-based) cement for corrosive water applications. However, problems with this type of lining material have been observed when handling corrosive geothermal brines.

Many concrete additives or admixtures are known to improve the strength and chemical stability of a water-based cement/concrete lining material. Additives providing such properties include polymers such as polystyrene. However, the water base cement is still the primary bonding agent of these additive mixtures.

A modification of the hydraulic cement/concrete lining process is to pre-coat the carbon steel before lining. An example of this technique is found in U.S. Pat. No. 4,787,936. High strength and adhesive attachment of the pre-coat is not required, since the pre-coat is encapsulated (e.g., protected from erosion) by the overlaying cementitious materials. However, the lining must still structurally withstand the environment and a separate pre-coating process step is required.

A further modification is to post-coat and/or impregnate the pre-formed cementitious liner. An example of this approach is found in U.S. Pat. No. 3,861,944. The post-coating need not bond to the steel pipe. However, the post coating and/or liner impregnation requires a separate processing step.

The wide range of in-situ properties of geothermal fluids have made them difficult to handle using these prior methods. The wide range of fluid properties is further widened during fluid processing making them sometimes more difficult to handle. Temperatures from ambient to in excess of 300° C., pH's ranging from highly acidic to basic, and dissolved (and precipitated) solid contents ranging to in excess of 20% by weight of the aqueous mixture are known to cause fluid handling problems. Even if the recovery of geothermal fluids is not an objective, these difficult-to-handle fluids may have to be handled during the recovery of oil, gas, and minerals or other natural resource recovery operations.

More recently, a waterless cement (i.e., containing insufficient water to hydrate the cement), filler and polymerizable liquid mixture (termed polymer concrete) has been developed for geothermal and other difficult applications. The polymer concrete is typically composed of a solid or aggregate mixture component, such as silica sand filler and Portland cement, and a polymerizable liquid mixture component. The liquid mixture typically contains one or more monomers and polymerization additives (e.g., catalysts). The liquid mixture may include cross-linking agents, coupling agents, initiators, solvents/heat dissipators, surfactants, accelerators, and viscosity control compounds.

Because of its cost and desirable properties, some polymer concrete compositions have included styrene as a component. Polystyrene is relatively water resistant, tends to maintain its shape, and is chemically resistant to many harsh aqueous fluids, such as inorganic liquid acids or bases. However, polystyrene may lack at elevated temperature sufficient chemical resistance, strength, and/or toughness, unless co-polymerized and/or cross-linked with other reactive unsaturates. The styrene molecule has only one reactive hydrocarbon (vinyl) site, thus making the polystyrene chain once formed (i.e., the one site reacted) difficult to cross-link and/or bond strongly to aggregate particles.

In past polymer concrete compositions (as shown in U.S. Pat. No. 4,500,674), styrene is combined with at least two different co-monomers to achieve the desired chemical resistance and strength characteristics, one of which is either acrylamide or acrylonitrile. However, these reactive materials may be toxic and/or carcinogenic. They may also compromise low cost fabrication methods (e.g., high temperature mixing and/or curing may be required), broad chemical resistance, and temperature stability of the resulting liner.

In a modified approach (as shown in U.S. Pat. No. 4,231,917), another monomer forms the major polymerizable constituent instead of styrene, but styrene may be a minor constituent. The small amount of styrene is only one of many possible minority co-monomers. The minority styrene composition may further compromise the broad chemical resistance and temperature performance of a liner when compared to the styrene majority composition.

A persistent problem with these current polymer concrete compositions is the necessity of trading-off broad spectrum chemical resistance to obtain strength. In addition, none having a majority monomer of styrene avoids requiring two reactive unsaturates/co-monomers, one specified as either acrylamide or acrylonitrile. Either material adds cost, complexity and health/safety risks to the manufacturing process of a finished product.

Other problems with current polymer concrete compositions are a propensity to crack, the carcinogenic nature of acrylonitrile and acrylamide, and difficulties in solubilizing in styrene and polymerizing acrylamide. Geothermal applications can impose severe conditions such as thermal expansion, thermal shock, vibration, and two phase flow conditions. These conditions tend to crack brittle polymer concrete liners. Acrylamide is a solid at ambient temperatures, which requires high temperature to mix and co-polymerize with styrene, which is a liquid at ambient conditions. Controlling high temperature during spin casting may be particularly difficult to achieve.

SUMMARY OF THE INVENTION

The present invention minimizes such problems by providing a barrier or lining which is the reaction product of cement, styrene, one or more co-polymers, and, as an option, a polymer dissolved in the styrene, wherein the styrene/co-polymer/dissolved polymer portion (i.e., liquid component) is composed of at least 50 percent by weight of styrene and dissolved polymer. The composition is essentially free of water sufficient to hydrate the cement, as well as previously required acrylamide and acrylonitrile co-monomers. The co-monomers of the liquid component are selected from a group of poly-olefinically unsaturated compounds (excluding acrylonitrile or acrylamide). The composition avoids the need for high temperature curing and other costs associated with the excluded compounds.

The materials described in the present invention produce acceptable liner strength under harsh geothermal operating conditions, achieving this result without a significant loss of broad spectrum chemical resistance or increase in cost. The liners made from these materials have been tolerant of off-design conditions, reliable, safe, and cost effective. The materials are also expected to meet the needs of other difficult applications. Various embodiments also include the use of aggregate gradation control, pozzolanic aggregate materials, high alumina cements, and rheology control additives to still further improve processing, handling, chemical resistance, and overall cost effective performance of lined pipe.

DETAILED DESCRIPTION OF THE INVENTION

Figure 1:
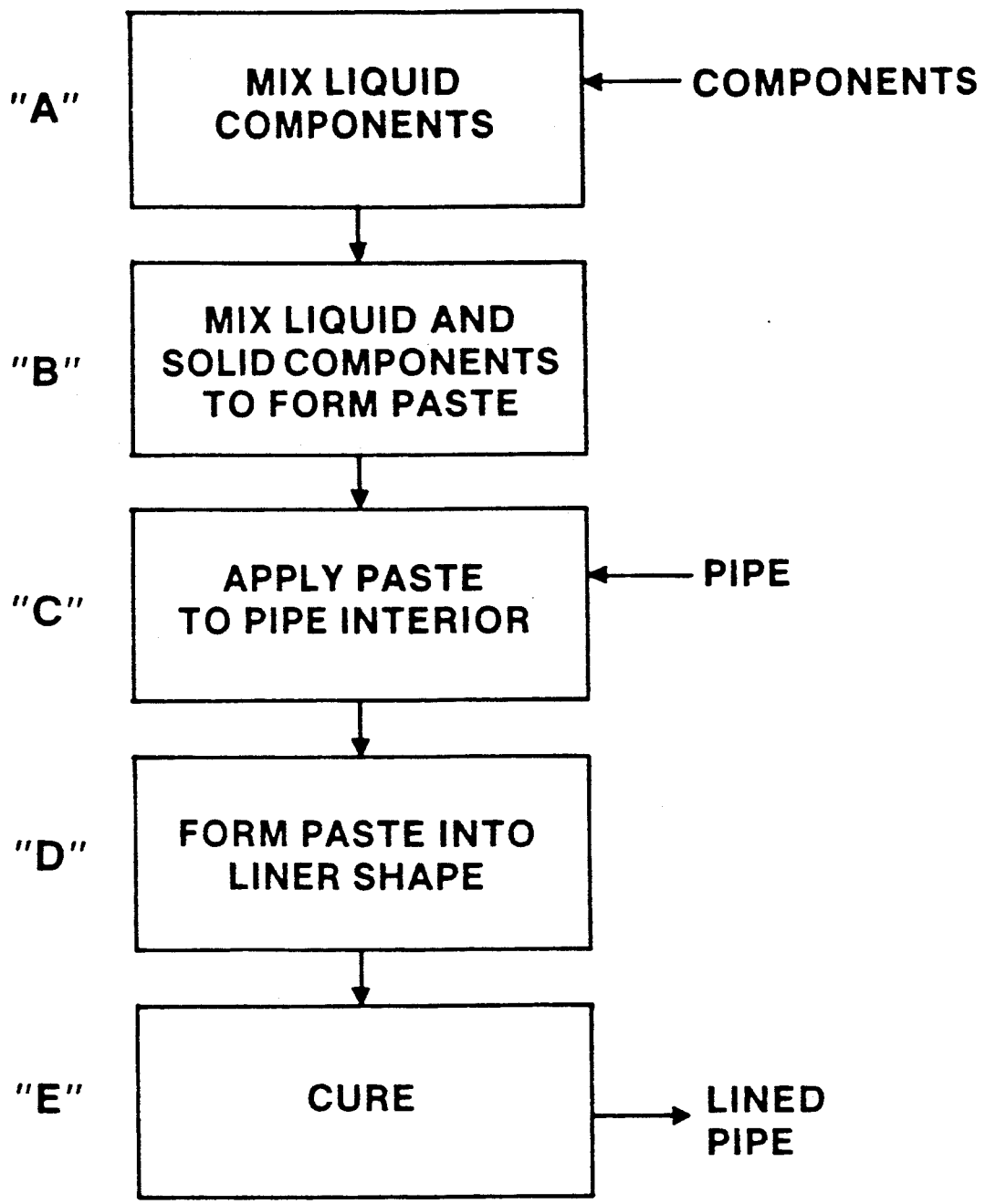
FIG. 1 shows a process flow schematic for hand trowelled lined pipe applications.

The present invention concerns a generally two phase material mixture used to form a polymer concrete fluid barrier. The two phase composition includes a solid particulate (or aggregate) component and a liquid component. The composition is particularly useful to form a polymer concrete lining bonded to a substrate (i.e., a carbon steel pipe). In the preferred embodiment, the two components are mixed, transferred to the pipe interior and centrifugally spun to shape the liner. The spinning may also be temporarily halted to drain excess liquid. The shaped liner can be cured at ambient or elevated temperatures to form a hardened liner. The resulting lined pipe appears to be resistant to a range of contained geothermal fluids, based upon initial testing. The resulting liners are also expected to be applicable to other difficult-to-handle fluid applications, such as process aqueous waste streams, acid gas handling, boiler blowdown, brine processing, and salt water heating/cooling piping.

Solid or Aggregate Component

The first of the two components is an aggregate mixture of solid particles forming at least 5 percent by weight of the material. Compositions having a wide range of aggregate mixtures produce acceptable results. The aggregate mixture typically includes an inorganic cement (e.g., Portland cement) and an inorganic filler (e.g., particles of a silicious material). An alternative embodiment of the material can contain an aggregate mixture composed only of inorganic cement.

An important ingredient of the aggregate component is a dry cement (i.e., a material which forms a slurry or paste when mixed with water and hardens into a solid or acts as a binding material). Cements are typically inorganic solids which hydrate or form precipitates after exposure to water which can react with the cement (i.e., free water). The dry cement may be a partially hydrated mixture, that is, the cement may have reacted with less water than that required stoichiometrically to fully react with the cement and binder, requiring additional free water to form a competent solid or binding matrix. However, it is significant in the present invention that the cement not be exposed to amounts of free water which would fully harden it into a solid/binding material during fabrication of the present lined pipe.

The preferred dry inorganic cement is Portland cement. Portland cement contains CaO as one of the primary oxide constituents. Other significant oxide constituents include CaO, $SiO_2$ and $Al_2O_3$, with other inorganic compounds and/or metal oxides, such as Fe, Mg, K, S, Na, Ti, and Mn oxide being optionally present in smaller quantities. A compositional range reported in weight percent of the chief oxide constituents of Portland cement is as follows: Calcium Oxide (CaO) 60–67, Silica ($SiO_2$) 17–25, Alumina ($Al_2O_3$) 3–8, Iron Oxide ($Fe_2O_3$) 0.5–6, Magnesia (MgO) 0.1–4, Sulphur Trioxide ($SO_3$) 1–3, and Soda and/or Potash ($Na_2O + K_2O$) 0.5–1.3. The dry powder form of these cements has particles having cross sectional dimensions generally less than 100 microns, typically averaging less than 50–75 microns.

Since the liquid mixture or component to be described hereinafter typically contains less than 2.0 percent free water by weight of the liquid component and essentially no free water is present in the solid component, the function of the cement is not clear, but is required to obtain the desired properties of the liner. No significant hydration of the cement particles appears to occur during the initial hardening phase of the liner (i.e., polymerization of the liquid component forms the binder). Even small amounts of water may be detrimental (e.g., a water film formed on the surface of the filler may prevent proper coupling between the polymer and the aggregates). Dry cement can help reduce the free water content (i.e., act as a desiccant or drying agent to remove any water film) which may be present during the curing of the polymer.

Still further, after the lined pipe is placed in service and the liner exposed to harsh aqueous fluids, some or all of the inorganic cement particles may slowly hydrate. A newly formed hydrate matrix may slowly overlay or replace the matrix provided by the polymer. Initial service liner properties may therefore not be indicative of later service properties when a geothermal fluid is contained.

The cement may also act as a neutralizer or buffering agent. As an acid or a low pH aqueous fluid permeates the polymer concrete liner, the cement particles may neutralize or raise the pH of the permeating fluids. The neutralized fluid contacting the substrate carbon steel would be less likely to be corrosive. In an alternative embodiment, additional quantities of lime (calcium oxide)/hydrated lime are added to the aggregate to increase this possible neutralizing property of the cement containing composition.

Although how the cement may function in these polymer concretes and geothermal environments has been discussed, it is not clear. The exact chemical mechanism(s) of cement interactions appear to be highly complex. However, the resulting cement interaction and properties of the polymerized liner composed of these cement particles are desirable and support the use of the liner in many harsh environments.

Although a liner can be formed using only cement (i.e., containing 100 percent cement and no filler), liner properties are more desirable if both a non-cement filler and cement are the constituents of the aggregate mix. Only a trace amount of cement in the aggregate component is required to obtain beneficial results (e.g., removal of a water film) in the fabricated liner properties. The quantity of cement needed is a function of the filler type and overall composition, processing parameters and applications. When the two components (i.e., liquid and solid components) are mixed and the resultant material centrifugally spun to form a pipe liner, the optimum ratio of cement to inorganic filler is controlled to a large extent by the spinning parameters. Generally, the amount of Portland cement used for these conditions ranges from between 10 and 50 percent by weight of the total aggregate component and the maximum amount of Portland cement for more unusual conditions ranges between 5 and 80 percent by weight of the total aggregate component. Material containing 20 to 30 percent by weight of Portland cement in the aggregate component has been used to centrifugally cast pipe liners having superior properties and is the preferred embodiment.

In an alternative embodiment, a more chemical resistant cement (acid and/or base resistant) has been used. the resistant cement, such as a calcium-aluminate (i.e., high alumina) cement, is used in place of Portland cement. The $Al_2O_3$ and $TiO_2$ content (i.e., at least 35 percent by weight of the cement) of high alumina cements typically exceeds that found in Portland cements. Although high alumina cement has been used to form hydraulic concretes which are more resistant to attack by carbon dioxide (a component of many geothermal fluids), other undesirable properties have made these hydraulic cements less satisfactory for geothermal service. Again, although the role played by dry, high aluminum cement in polymer concrete is poorly defined, test results show superior geothermal service properties for polymer concrete compositions which include a high alumina cement. The minimum and maximum amounts of high alumina cement used in the composition are essentially equal to the amounts previously disclosed for Portland cement.

In another alternative embodiment, an expanding cement or non-shrinking cement (i.e., a cement which does not shrink upon setting after mixing with water) has been used. An example of non-shrinking cement is a magnesium oxide cement, such as Plastic Porcelain No. 30, supplied by Sauereisen Cements Co., Pittsburgh, Pa. Non-shrinking cements may also be mixed with other shrinking cements to form an acceptable liner. Again, the role played by these cements in polymer concrete is poorly defined.

Other types of essentially dry and/or unreacted cements which are normally reacted with sufficient amounts of water (i.e., free water) to form a bonding matrix (but which are set without substantial amounts of water in the composition of this invention) are also acceptable. This includes other silicate based cements and cements which include organic materials, such as plastic containing cement. Combinations of different cements are also possible.

Carefully controlling and limiting the free water content of the material during the material handling and forming may be critical to optimizing polymer concrete liner properties, based upon a series of relative strength tests. A styrene, TMPTMA, and catalyst liquid mixture component (as hereinafter described) and a Portland cement and filler solid component mixture with and without added portions of water were formed into samples, cured and subjected to strength testing. For these tests, water was first added to the solid component and allowed to stand 1 hour. The polymerizable liquid mixture was then added, mixed and allowed to cure, first at ambient temperature, then at 93° C. (200° F.) for 66 hours.

Testing indicated that water contents of up to approximately 2 percent by weight of the total mixture had little or no effect upon strength (i.e., up to 2 percent added water samples retained at least 90 percent of the strength of samples having no free water). Larger proportions (i.e. greater than 2 percent by weight of the total mixture) of water produced significant reductions in strength. The material strength of samples having water in excess of 10–12 percent by weight could not be determined (i.e., sample crumbled). Based upon these tests, drying, partially dehydrating solids or otherwise driving off free water from certain wet materials (e.g., materials which have been exposed to excessive moisture) prior to mixing and forming the liner may be necessary to obtain optimum liner strength and other properties.

A maximum amount of free water in the aggregate and liquid is the amount required to fully react with (e.g., hydrate and be absorbed by) the cement and filler, hereinafter defined as a fully hydrating quantity. A generally applicable maximum amount of free water in the aggregate when no free water has been added to the liquid component is 90 percent of the fully hydrating quantity. For more reliable applications, free water in the aggregate is limited to a maximum quantity of 50 percent of the fully hydrating quantity. For still further reliable applications, a maximum quantity of free water is 10 percent of the fully hydrating quantity. In the preferred embodiment, no free water is added to the aggregate and solid materials exposed to excessive water are dried/dehydrated.

A non-cementitious filler is used as the major remaining constituent of the aggregate mixture in the preferred embodiment. The typically inorganic (i.e., silicious) filler can be composed of sand, crushed quartz or granite particles. The particles can be in a range of sizes, including powder-like materials, such as silica flour. Although no filler is required, a filler (i.e., sand including a silica flour) preferably makes up between 30 to 80 percent by weight of the aggregate mixture. In some applications, filler can make up to 90 percent by weight of the aggregate mixture.

In another alternative embodiment, pozzolanic materials/particles are used in the aggregate mixture. The pozzolanic materials include fuel ash (i.e., residue after organic materials have been oxidized), processed oil shale (i.e., residue after organic materials have been removed to produce a liquid fuel), and geothermal sludges/brine precipitates. These pozzolanic particles may be acid washed prior to use in the polymer concrete.

Although pozzolanic materials have been used in hydraulic cements, the function of the pozzolanic materials in waterless polymer concrete has not been fully determined. Pozzolanic materials are known to stabilize Portland cement when hydrated. In the polymer concrete of this invention, the pozzolanic materials may slowly combine with the free lime during any water uptake and inorganic cement hydration. Since hydroxides, such as calcium hydroxide, are reactive (i.e., readily subject to chemical attack by geothermal fluids), this combination with a pozzolanic material may improve the chemical resistance of the hydrated cement which might form.

Particle sizes of the aggregate (cement and other filler particles) mixture are gradated in the preferred embodiment to form a smooth top or inner surface. The filler can include a powder-like silica flour, defined herein as a silicious material having an average particle cross-sectional dimension of less than 100 microns, typically in the range of 5 to 30 microns. The proportion of silica flour as a weight percent of the aggregate component is essentially unlimited, but typically ranges from 5 to 30 percent.

Using gradated filler (i.e., a distribution of filler particle sizes) reduces fluid requirements and minimizes the tendency to form an overly thick skin or surface layer. An undesirable overly thick skin is composed of an excessive amount of cement sized particles and polymer as a result of the spin/centrifugal casting process. The aggregate materials, having different sizes and densities, tend to segregate during agitation or centrifuging. The lighter and more easily suspended particles and liquids tend to concentrate at the top (or at the inside diameter of centrifuged liners), forming a smooth desirable surface. Poorly gradated filler can result in overly thick, crack-prone skins or inadequate substrates by depleting the quantity of fine filler material in the main body of the liner. Use of specific gradated aggregates can result in a desirable surface (i.e., smooth skin surface) while limiting excessive segregation tendencies.

A representative distribution (reported in terms of weight percentage and size gradation of the cement and silicious particles) is given in Table 1 as follows:

TABLE 1

| GRADATION OF AGGREGATE PARTICLE SIZES | |
|---|---|
| Sieve Size Range, mm. | Weight Percent |
| Filler, 1.400–1.180 | 1.0 |
| Filler, 1.179–0.850 | 6.0 |

TABLE 1-continued

| GRADATION OF AGGREGATE PARTICLE SIZES | |
|---|---|
| Sieve Size Range, mm. | Weight Percent |
| Filler, 0.849–0.425 | 14.0 |
| Filler, 0.424–0.250 | 28.0 |
| Filler, 0.249–0.180 | 3.0 |
| Filler, 0.179–0.106 | 7.0 |
| Filler, 0.105–0.002 | 17.0 |
| Cement, <0.05 | 24.0 |

It is beneficial to have at least a two peak (i.e., bimodal) distribution of particle sizes (i.e., a frequency distribution of particle sizes peaking at two or more size ranges). One of the peaks in the particle size distribution is that belonging to a powder-like material or flour. The second, sometimes overlapping peak, is that belonging to particle sizes representative of cement. Another peak denotes particles whose diameter is greater than that of the flour material by at least one order of magnitude.

Control of the maximum size particle as well as the distribution of sizes (i.e. gradation) is important in obtaining optimum results, especially for spun or centrifugally cast liners. The maximum particle size is a function of liner thickness and consequently the pipe diameter, as well as other factors. The maximum particle size is generally less than about 2.4 mm for common pipe and for liner sizes currently used in geothermal applications, preferably less than 1.4 mm.

Controlling the ratio of the quantity of the silica flour portion of the aggregate to the quantity of the cement portion of the aggregate is a method of directly controlling cured liner properties and indirectly influencing slurry viscosity and skin thickness. A nominal ratio of four parts cement to one part silica flour has produced a lining having desirable properties and is the preferred embodiment; however a range of cement:flour ratios from 2:1 (two parts cement to one part silica flour) to 8:1 (eight parts cement to one part silica) and higher also produces liners having acceptable properties. The more general range of cement:silica flour ratios is from 5:2 to 4:1. A maximum silica flour content of 30 percent by weight of total solids is a typical practical limit independent of the cement:silica flour ratio.

An alternative embodiment especially useful for hand trowelling applications includes fibrous and/or fibrous shaped fillers in the mixture. The fibers are generally composed of inorganic materials, such as glass, but may also be composed of other materials, such as graphite. Although fibers of almost any length and diameter can be used, fiber lengths rarely exceed 0.6 cm (0.25 inch) for practical handling considerations. Average fiber diameters typically range from 10 to 20 microns (0.0004 to 0.0008 inch) in diameter. Average fiber lengths typically range from 0.3 to 0.4 cm (0.12 to 0.16 inch) and the most common aspect ratio (i.e., length to diameter) ranges from approximately 100 to 200.

For the purposes of this invention, it is intended that the term "fiber" or "fibrous filler" encompass materials which may have polar functional groups in the form of relatively short filaments as well as longer fibers often referred to as "filaments." Illustrative polar functional groups contained in suitable fibers are hydroxyl, ethereal, carbonyl, carboxyl, thiocarboxyl, carboxylate, thiocarboxylate, amido, amino, etc. Essentially all natural fibers include one or more polar functional groups. Illustrative are virgin and reclaimed cellulosic fibers such as cotton, wood fiber, coconut fiber, jute, hemp, etc., and protenaceous materials such as wool and other animal fur. Illustrative synthetic fibers containing polar functional groups are polyesters, polyamides, carboxylated styrene-butadiene polymers, etc. Illustrative polyamides include nylon-6, nylon 66, nylon 610, etc.; illustrative polyesters include "Dacron," "Fortrel," and "Kodel"; illustrative acrylic fibers include "Acrilan," "Orlon," and "Creslan." Illustrative modacrylic fibers include "Verel" and "Dynel." Illustrative of other useful fibers which are also polar are synthetic carbon (i.e., graphite), silicon, boron and magnesium silicate (e.g., asbestos) polymer fibers and metallic fibers such as aluminum, gold, and iron fibers. The use of non-polar fibers are also possible in alternative embodiments.

In another alternative embodiment, a small amount (additive) of a solid constituent is added to the solid and liquid mixture to obtain a desired rheology (i.e., slurry or mortar mix/paste consistency). Cab-O-Sil and Hi-Sil have been found to be effective as a thickening or rheology control additives for hand trowelling applications whereby the resulting thixotropic material is manually applied to the pipe interior. The two specific additive materials are currently supplied by Cabot (Cab-O-Sil) and PPG (Hi-Sil) companies. Such additives are believed to be composed, at least in part, of amorphous silica and appear to be highly surface reactive. These amorphous silica additives soak up the "liquid component" after mixing, adding tackiness and body to the two component mixture while not significantly affecting the kinetics of polymerization.

These viscosity additives are not required but can be used in fabricating centrifugally cast liners. Additives were found to be very beneficial in hand lining, repair, and patching operations. The slurry mixtures containing these additives are highly thixotropic and easy to apply, and remain in place until hardening has taken place.

The range of amorphous silica additives (Cab-O-Sil M-5 or EH-5, and Hi-Sil T-600) that can be added to form as much as 25 percent or more by weight, but for practical (i.e., cost, etc.) purposes is restricted to a maximum of 6.0 percent by weight of the solid component (i.e., aggregate mix) comprising the material. Lower concentrations (at least 0.5 percent, typically at least 1.5 percent, but less than 3.0 percent by weight of the aggregate component) are normally sufficient to enhance the thixotropic properties of the mix.

Although other constituents may be present in the solid or aggregate mixture, specifically limited or excluded is acrylamide. Significant quantities of acrylamide were previously cited (i.e., in U.S. Pat. No. 4,500,674) as important to the integrity of a polystyrene majority polymer cement. Testing of material made from aggregate and specific liquid constituents hereinafter described, but excluding acrylamide and/or acrylonitrile, has yielded positive results. Liners produced from mixtures which contain no detectable amounts of acrylamide and/or acrylonitrile have been found to withstand harsh geothermal environments. However, minor amounts of acrylamide and/or absorbed acrylonitrile, i.e., less than one percent by weight of the solid component, are acceptable.

Liquid Component

The liquid component is composed of a combination of styrene, at least one co-monomer, and an optional dissolved polymer, forming a fluid mixture. The combination of the styrene and any dissolved polymer composes at least 50 percent of the fluid mixture. The next largest constituent of the liquid component is an olefinic substance, typically at least one polymerizable poly-olefinically unsaturated co-monomer in the form of a fluid. The styrene, co-monomer(s), and solubilizable polymer fluid mixture polymerizes to form an aggregate binder or binding matrix for the solid component. The binder comprises at least 5 weight percent of the resulting (non-homogeneous) liner material. Because of mixing, compaction and drainage during spinning, 10 percent by weight of the total is a preferred minimum proportion of liquid component. The optimum proportion of liquid is a function of spin rate, spin time and aggregate properties.

The dissolved polymer is typically composed of a homopolymer of styrene, i.e., polystyrene. The polystyrene is pre-dissolved/premixed typically with the styrene, but the polystyrene or other polymer may also be pre-dissolved/premixed with the liquid co-monomer(s) or the fluid mixture.

The total styrene plus polystyrene content is generally greater than 50 percent by weight of the liquid component. Preferably, the styrene/polystyrene mixture content varies from 55 to 95% by weight of the total liquid component, and more preferably from 60 to 90 percent by weight of the total liquid component.

In an alternative embodiment, styrene can be used without a polymer in the liquid component; however, a premixed polymer has been found to improve the properties of some fabricated liners (e.g., less fracturing). The polystyrene, when used, appears to act as a thickening agent and as a plasticizer after polymerization. The maximum amount of a dissolved polymer is limited only by styrene solubility considerations, but 14 weight percent dissolved polystrene in styrene appears to be a practical styrene mixture limit. Choosing the optimal proportion of polystyrene is dependent upon factors such as liner fabrication temperature and spinning parameters, with typical proportions ranging from 5 to 10 weight percent.

The amount of styrene mixture in the liquid component is a function of the specific polymerizable reactive unsaturate (i.e., co-monomer) chosen. The specific co-monomer(s) used are selected from a specific group of poly-olefinically unsaturated compounds. The molecular structure of these compounds is characterized by at least two reactive olefinic bonds, and typically containing at least one hydrocarbon-containing vinyl group. The preferred monomer has 4 to about 40 carbon atoms and at least 2 vinyl substituents per molecule. The monomer molecule may contain carbonyl, carboxyl, hydroxyl, thiol, thiocarbonyl, carboxylic acid ester, thioester, amine, amide, silane, silanol, siloxane, and combinations thereof. The carbon containing compounds may also contain heteroatoms, such as one or more members selected from the group consisting of nitrogen (N), oxygen (O), and sulfur (S).

The poly-olefinically unsaturate can also be characterized as compounds from one or more of the following groups: hydrocarbonolefins having about 4 up to about 20 atoms; olefinically unsaturated vinyl esters, thioesters; amides of saturated carboxylic acids having up to about 20 carbon atoms; esters, thioesters, and amides of olefinically unsaturated carboxylic acids having up to about 20 carbon atoms; polyesters, thioesters, and amides of saturated polyhydric alcohols; thiols, polyamides, and olefinically unsaturated carboxylic acids having up to about 20 carbon atoms; polyesters, thioesters and amides of saturated poly-carboxylic acids and olefinically unsaturated alcohols, thiols, and amides; and polyhydrocarbenyl silanes and siloxanes having up to about 20 carbon atoms per molecule.

The initial tests have shown that several compounds within this poly-olefinic unsaturate/vinyl compound group produce acceptable liners for geothermal environments. These include: trimethylolpropane-trimethacrylate; divinyl benzene; hexadiene; polyvinylmethylsiloxane; and gamma-methacryloxypropyl-trimethyloxysilane. In view of the foregoing, it is clear that one can employ related compounds as co-monomers. These related compounds include: vinyl containing compounds, such as vinyl benzenes; dienes, preferably having a molecular structure characterized by from 5 to 15 carbon atoms; and a group of silicone substituted molecules containing at least two reactive vinyl groups, such as polyvinylsiloxanes and polyvinyl silanes.

Specifically limited or excluded from the composition of the liquid component are significant amounts of dissolved acrylamide and acrylonitrile co-monomers. Both of these materials are costly and can also be considered known or potential carcinogens. Since acrylamide is a solid at ambient temperature, an elevated temperature and extensive mixing are also required to polymerize compositions which contain it. Extensive heated mixing and transfer of the amount needed to line a 40 foot pipe section create still further costs and problems. The composition (liquid and solid components) excludes or limits these two specific co-monomers (acrylamide and/or acrylonitrile) and their derivatives to less than a significant amount (defined quantitatively herein as less than 3 percent by weight of the total composition). Preferably, very small amounts (defined herein as less than 1 percent by weight of either the liquid or the solid component) of either one or both of these co-monomer compounds may be tolerated, but compositions which exclude acrylamide and acrylonitrile are most preferred for safety, cost and handling ease.

Also specifically limited or excluded from the liquid component of the composition is free water (i.e., water that is available to react with the aggregate mixture). An absolute maximum quantity of free water in both the aggregate mixture is the amount required to fully react with the aggregate mixture (i.e., the fully hydrating quantity). A more generally applicable maximum amount of free water in the liquid component when dry aggregate is used is 90 weight percent of the fully hydrating quantity. For more general applications, the free water in the liquid component is limited to 50 weight percent of the fully hydrating quantity. A more reliable maximum value of free water is to limit it to no more than 10 weight percent of the fully hydrating quantity. In the preferred embodiment, no free water is added to the liquid mixture, except for a small amount associated with the catalyst.

The proportion of one or more co-monomers as a weight percent of the liquid component varies depending upon the specific co-monomer(s) used. Overall, the co-monomer proportion can range from 0.5 percent to nearly 50 percent by weight of the liquid component, preferable less than 45 percent by weight. The maximum practical amounts of some of the specific co-monomers which have produced acceptable liner properties expressed as a weight percentage of the total liquid component are as follows: 40 percent trimethylolpropane-trimethacrylate; 25 percent divinyl benzene; 15 percent of polyvinylmethylsiloxane; 15 percent hexadiene; and 10 percent gamma-methacryloxypropyl-trimethyloxysilane. The minimum practical amount of each of these specific co-monomers is 0.5 percent by weight of the liquid component; usually at least a proportion of about five percent by weight of the liquid component.

In small amounts (e.g., less than about 7 liquid weight percent in some instances), one or more of the co-monomers, such as gamma-methacryloxypropyl-trimethyloxysilane, is thought to act exclusively as a coupling agent. This coupling agent co-monomer appears to be chemically absorbed by or to coat the inorganic particles and provides reactive vinyl attachment sites for the bulk polymer phase, increasing material strength. Increasing the proportion of gamma-methacryloxypropyl-trimethyloxysilane over 7 percent has little further effect on material strength. That is, it appears to have fully coated the solids, with the excess acting as an additional co-monomer in the bulk polymer phase. The coupling agent may also fully encapsulate the inorganic particles, when used in higher concentrations.

A relatively small portion of the remaining liquid component is typically composed of polymerization additive(s) or catalyst(s), defined as materials which control the onset and/or rate of polymerization (e.g., initiation or acceleration additives) of the styrene and co-monomer(s). Although a polymerization additive is not required, a trace amount (i.e., minimum detectable amount) is beneficial to control polymerization. The maximum amount of each of these additives is limited primarily by practical limits, such as set times, material performance, and cost.

Solutions of the useful monomers and polymers can be prepared by procedures known in the art to be suitable for the preparation of the styrene and poly-olefinically unsaturated monomers reacting to form a polymer solid or binder. For instance, monomers, solvents and/or polymer dispersions can be prepared by gradually adding each monomer simultaneously to a reaction medium at rates proportionate to the respective percentage of each monomer in the finished polymer and initiating and continuing polymerization by providing in the reaction medium a suitable polymerization catalyst. Illustrative of such catalysts are free radical initiators and redox, systems such as hydrogen peroxide, potassium or ammonium peroxydisulfate, dibenzoyl peroxide, lauryl peroxide, di-tertiary-butyl peroxide, bisazodiisobutyronitrile, either alone or together with one or more reducing components such as sodium bisulfite, sodium metabisulfite, glucose ascorbic acid, erythorbic acid, etc. The reaction can also be controlled with agitation and temperature sufficient to maintain the reaction rate until all monomers are consumed.

Six percent by weight of the liquid is a maximum practical proportional limit of each polymerization additive or catalyst. The proportion of each polymerization additive is typically limited to a range of from 0.25 to 3.0 percent by weight of the liquid component, and more typically limited to a range of from 0.5 to 1.5 percent by weight.

A specific initiator found particularly useful is benzoyl peroxide. This has been shown to be effective in initiating rapid polymerization at ambient conditions. A nominal 1.0 percent solution (by weight of the liquid monomeric component) of benzoyl peroxide has been used in some of the testing. Methylethylketone peroxide has also been found to be an alternative and/or higher temperature initiator or catalyst. N,n,-dimethylaniline and cobalt napthenate have been particularly useful as accelerators (each also at a nominal concentration of 1% by weight of the liquid component).

Alternative embodiments do not include an initiator or accelerator. Although polymerization can be accomplished without catalysts and controlled by thermal or other means in this alternative embodiment, the preferred method (using catalysts) allows ambient temperature curing and field handling of the composition.

FIG. 1 shows a process by which the two component mixture described above can be used for hand trowelling applications. The mixing step "A" of the trowelling application blends all the liquid components with the initiators and accelerators at ambient temperature conditions prior to mixing with the aggregate component. In an alternative process, the aggregate is first mixed with a liquid coupling agent which coats and/or encapsulates the solid particles. The coating provides a reactive surface which can polymerize internally or with monomers constituting the bulk of the liquid phase. In the alternative process, the remainder of the liquid components are then mixed with the aggregate instead of mixing all the liquid components prior to combining with the filler as shown in FIG. 1.

In the next process step "B," the solid component is mixed at ambient temperature with the liquid mixture to form a mortar or thick concrete slurry. This must be accomplished well before gelation of the liquid mix has occurred (as characterized by a gel time). A typical example of a gel time when using catalysts is 25-45 minutes. Mixing the initiator(s) and accelerator(s) into the monomeric liquid (Step "A") begins the gelation process, and the remaining slurry process steps (steps "C" and "D") must be accomplished within this gel time. For hand trowelling applications, a rheology control additive is typically included in the solid aggregate mixture, as previously discussed.

In the next process step "C", the thickened slurry is transferred and applied to the interior of the piping section. This slurry application is typically by hand transfer, but can also be sprayed, pumped, drained, ladled or otherwise transferred.

In the next process step "D," the material is formed into the desired shape. This can be accomplished by hand forming (e.g., trowelling) or by using casting forms. Liners can be patched or gaps between liner sections filled using similar techniques.

In the final process step "E," the liner is allowed to cure at ambient temperature. Hardening progresses as the polymerization proceeds. In an alternative embodiment, another processing step is added wherein the material is post cured at elevated temperature(s), either at dry conditions and/or when exposed to a hot aqueous fluid, such as a geothermal brine. High temperature curing at 71° C. (160° F.) or higher is usually necessary for siloxane cross-linked systems.

Figure 2:
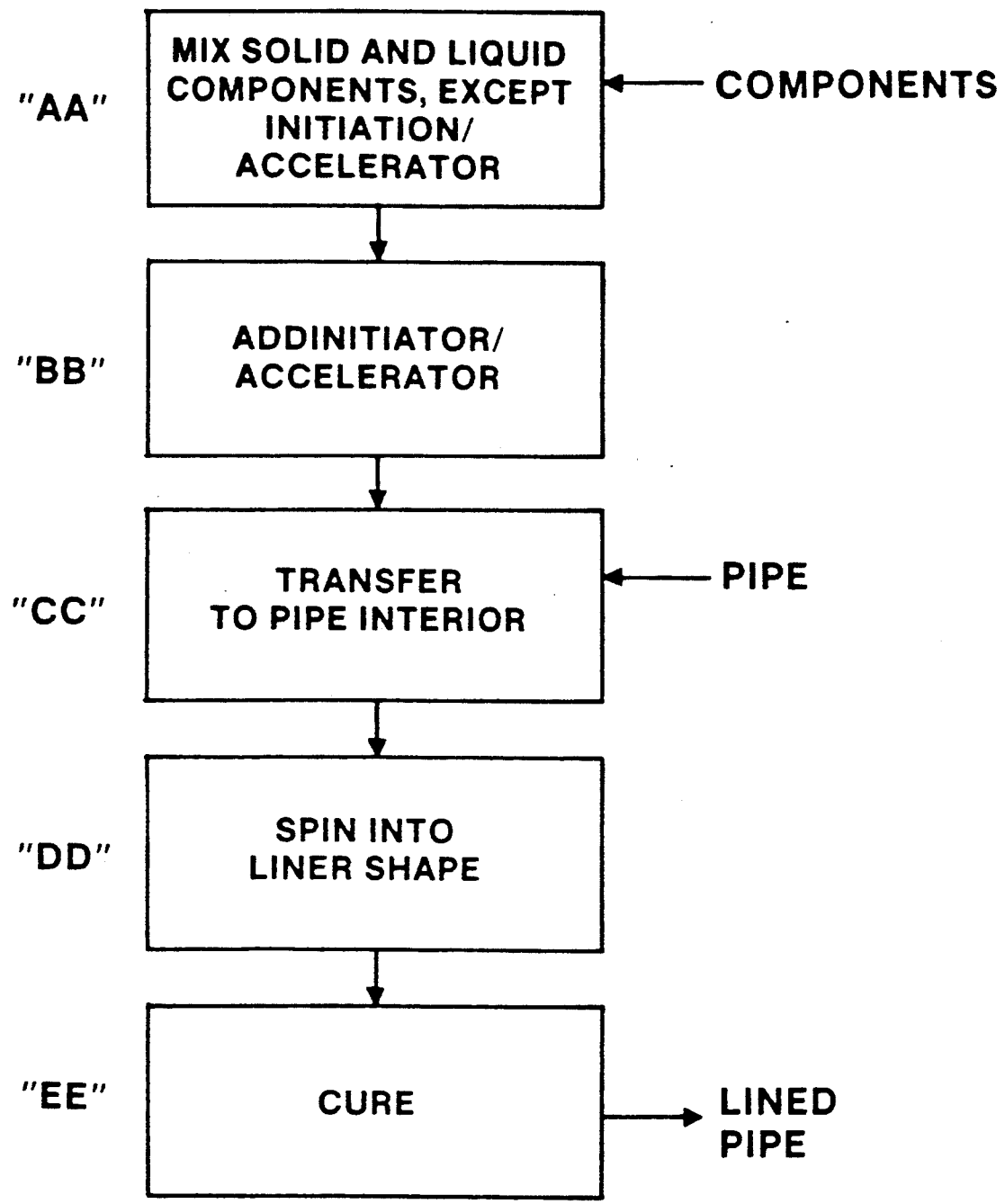
FIG. 2 shows a process flow schematic for centrifugally cast lined pipe applications.

FIG. 2 shows a process of using the two component mixture as described above for centrifugal casting applications. The first step "AA" is to mix the solid and liquid components, except for the initiator(s) and accelerator(s) to form a slurry. Two initiators (benzoyl peroxide and methylethylketone peroxide) were generally used, one reactive at a low temperature and one designed to be reactive at higher temperatures. Mixing step "AA" can be accomplished by first pre-mixing the solids (i.e., commingling and breaking up agglomerates) and then adding and mixing the liquid component (without the initiator and/or accelerator) to obtain a desired slurry consistency. An alternative to the first step "AA" is to mix solids, liquids and initiators, but withhold the accelerator (or visa versa). The slurry thus formed (without either the accelerator or initiator) can generally be flowed for extended periods of time.

The next step "BB" is to add the polymerization initiator(s) and/or accelerator(s) to the mixture. The addition(s) are mixed into the slurry. The addition(s) begin the gelation process and defines the working period within which the liner must be cast. This adding step "BB" is followed by a transfer step "CC" wherein the slurry is conveyed and applied to the pipe interior. Conveyance may be accomplished by means such as pumping the liquid-like slurry, gravity flow of the slurry via troughs, belt, auger or portable trough conveyance.

The pipe and transferred slurry are then spun around the pipe's cylindrical axis to shape the material into a liner in spinning step "DD". The centrifugal force during the spin casting distributes the slurry material on the interior pipe surface. Dams or barriers are placed at the ends of the pipe sections to retain the material in place prior to and during centrifuging.

In the final hardening step "EE," the liner is allowed to cure. The cure normally occurs at ambient temperature for a time sufficient to harden it for service in geothermal or other applications. Elevated temperature (i.e., oven) post curing may be employed, and is preferred for some mixtures, especially when polyvinylsiloxane is the reactive unsaturate. Exposing the liner to aqueous fluids at elevated temperatures (e.g., geothermal fluids), may also be provided to further harden the liner as part of a post curing step.

When excess polymerizable liquids are present during curing and/or spinning, alternative process step(s) can be provided. These added steps split the spinning step, wherein the excess fluids are allowed to drain from the section after an initial spinning step. The section can then be re-spun to minimize slumping, etc. In the initial spinning step, the liner is shaped and the aggregate compacted sufficiently to allow the drainage of excess fluids. In the re-spinning step, the liner is allowed to harden to the extent that further drainage or slumping is precluded.

Unless a release compound or separation material is placed at the spinning mixture's liner/pipe interface, the hardened and cured liner component is bonded (i.e., adheres) to the pipe after the casting process. In an alternative embodiment, release compound may be applied to the steel piping or fitting (now serving as a form) to create a separate concrete pipe/fitting having an outer diameter equal to the inside diameter of the pipe/fitting form. In modified embodiments, partial bonding of the liner to the pipe or pipe sections, connectors or fittings may allow some relative motion (e.g., resulting from thermal expansion) of the liner with respect to the pipe/fitting. The pipe/fitting can also be pre-treated with a coupling agent or mechanical bonding system (e.g., a welded screen) to facilitate bonding to the liner.

Still other alternative embodiments are possible. These include: a plurality of liner segments within a single pipe section separated by elastomeric or plastic seals; extending the liner beyond the end of the pipe section to interconnect with tanks or other equipment; having the outer pipe composed of other materials, such as other structural metals, relatively rigid elastomers, plastics, concrete, porous or insulating materials. Other alternatives are to place an intermediate material between the pipe wall and liner (i.e., pre-coat the pipe interior), or add a protective enclosure or external covering to the steel pipe.

The invention satisfies the need to provide a low cost, easy to apply liner to steel pipe for use in harsh geothermal or other environments. The dry cement, other aggregate, and the monomers are relatively non-toxic. Costly acrylamide and acrylonitrile have been limited or excluded from the mixture. The mixture hardens to provide a strong thermally stable liner without compromising chemical stability.

Further advantages of the invention include: increased safety, (eliminates need for carcinogenic materials), reliability (as little as a single co-monomer plus coupling agent, if required, reduces complexity), and lower cost (no high temperature cure and major use of an inexpensive styrene).

EXAMPLES

The invention is further described by the following examples which are illustrative of specific modes of practicing the invention and are not intended as limiting the scope of the invention in any manner as defined by the appended claims. The examples are polymer samples (bottle tests) and liners which were fabricated during the initial testing phase:

EXAMPLE 1

A series of liquid mixtures using the co-monomer trimethylolpropane-trimethacrylate (TMPTMA) and catalyst (methylethylketone peroxide and di-t-butyl peroxide were prepared in a jar or bottle. Initial curing occurred at a temperature of about 38° C. (100° F.) for a period of approximately 4–5 hours each. Initial inspection results from one series are shown in Tables 2–4 as follows:

TABLE 2

LIQUID MIXTURES 1, INITIAL BOTTLE TEST RESULTS-EXAMPLE 1

| Constituent weight % | | | | | | | | |
|---|---|---|---|---|---|---|---|---|
| styrene | 97 | 93 | 89 | 85 | 94 | 90 | 86 | 82 |
| polystyrene | 0 | 4 | 8 | 12 | 0 | 4 | 8 | 12 |
| TMPTMA | 2 | 2 | 2 | 2 | 5 | 5 | 5 | 5 |
| MEKP/DTBP | 1 | 1 | 1 | 1 | 1 | 1 | 1 | 1 |
| Results | | | | | | | | |
| liquid/gel/fuse | g | g | g | g | g | g | g | g |
| React. strength | 0 | 0 | 0 | 0 | 0 | 0 | 0 | 0 |
| Cracking | 0 | 0 | 0 | 0 | 0 | 0 | 0 | 0 |
| Crazing | 0 | 0 | 0 | 0 | 0 | 0 | 0 | 0 |
| Color | o | o | o | o | o | o | o | o |
| Clear | c | c | c | c | c | t | c | c |
| Layers | 1 | 1 | 1 | 1 | 1 | 1 | 1 | 1 |

TABLE 3

LIQUID MIXTURES 2, INITIAL BOTTLE TEST RESULTS-EXAMPLE 1

| Constituent weight % | | | | | | | | |
|---|---|---|---|---|---|---|---|---|
| styrene | 90 | 86 | 82 | 78 | 75 | 71 | 77 | 73 |
| polystyrene | 0 | 4 | 8 | 12 | 0 | 4 | 8 | 12 |
| TMPTMA | 10 | 10 | 10 | 10 | 25 | 25 | 25 | 25 |
| MEKP and DTBP | 1 | 1 | 1 | 1 | 1 | 1 | 1 | 1 |
| Results | | | | | | | | |
| liquid/gel/fuse | g | g | f/g | f/g | g | f/g | f/g | f/g |
| React. strength | 0 | 0 | 0 | 0 | 0 | 0 | 0 | 0 |
| Cracking | 0 | 0 | 0 | 0 | 0 | 0 | 0 | 0 |
| Crazing | 0 | 0 | 0 | 0 | 0 | 0 | 0 | 0 |
| Color | o | o | w/o | w/o | w/o | w/o | w/o | w/o |
| Clear | c | t | t | t | c | t | t | t |
| Layers | 1 | 1 | 1 | 1 | 1 | 2 | 2 | 2 |

TABLE 4

LIQUID MIXTURES 3, INITIAL BOTTLE TEST RESULTS-EXAMPLE 1

| Constituent weight % | | | | | | | | |
|---|---|---|---|---|---|---|---|---|
| styrene | 59 | 55 | 51 | 47 | 40 | 36 | 32 | 28 |
| polystyrene | 0 | 4 | 8 | 12 | 0 | 4 | 8 | 12 |
| TMPTMA | 40 | 40 | 40 | 40 | 59 | 59 | 59 | 59 |
| MEKP and DTBP | 1 | 1 | 1 | 1 | 1 | 1 | 1 | 1 |
| liquid/gel/fuse | g | f/g | f/g | f/g | g | f | f | f/g |
| React. strength | 0 | 0 | 0 | 0 | 0 | 0 | 0 | 0 |
| Cracking | 0 | 0 | 0 | 0 | 0 | 0 | 0 | 0 |
| Crazing | 0 | 0 | 0 | 0 | 5 | 2 | 1 | 0 |
| Color | o | w/o | w/o | w/o | b | w | w/o | w/o |
| Clear | c | — | — | — | — | — | — | — |
| Layers | 1 | 2 | 2 | 2 | 1 | 1 | 2 | 2 |

Nomenclature for tables 2–4 is as follows:
liquid/gel/fuse: 1 = liquid; g = gel; and f = fuse
React. Strength: arbitrary 0–5 scale, force to remove
Cracking: arbitrary 0–5 scale, 0 = no cracking
Crazing: arbitrary 0–5 scale, 0 = no crazing
Color: w = white, y = yellow, o = olive, b = blue, a = amber
Clear: c = clear, t = turbid, p = opaque
Layers: number of layers observed The inspections shown above in Tables 2–4 were accomplished at about 27° C. (80° F.) over a 7 hour period. After these inspections, the bottle samples were then cured at 93° C. (200° F.) for a period of approximately 19 hours, and the inspections repeated. Inspections were accomplished at room temperature conditions. Final inspection results are shown in Tables 5–7 as follows:

TABLE 5

LIQUID MIXTURES 1, FINAL BOTTLE TEST RESULTS-EXAMPLE 1

| Constituent weight % | | | | | | | | |
|---|---|---|---|---|---|---|---|---|
| styrene | 97 | 93 | 89 | 85 | 94 | 90 | 86 | 82 |
| polystyrene | 0 | 4 | 8 | 12 | 0 | 4 | 8 | 12 |
| TMPTMA | 2 | 2 | 2 | 2 | 5 | 5 | 5 | 5 |
| MEKP and DTBP | 1 | 1 | 1 | 1 | 1 | 1 | 1 | 1 |
| Results | | | | | | | | |
| liquid/gel/fuse | g | g | g/f | g/f | g | g/f | g/f | g/f |
| React. strength | — | — | — | — | — | — | — | — |
| Cracking | 0 | 0 | 0 | 0 | 1 | 1 | 0 | 0 |
| Crazing | 5 | 5 | 3 | 3 | 0 | 0 | 0 | 1 |
| Color | b | b | w/b | w/b | p | p/w | b/w | b/w |
| Clear | c | c | t/c | t/c | c | t/c | c/t | c/t |
| Layers | 1 | 1 | 2 | 2 | 1 | 2 | 2 | 2 |

TABLE 6

LIQUID MIXTURES 2, FINAL BOTTLE TEST RESULTS-EXAMPLE 1

| Constituent weight % | | | | | | | | |
|---|---|---|---|---|---|---|---|---|
| styrene | 90 | 86 | 82 | 78 | 75 | 71 | 77 | 73 |
| polystyrene | 0 | 4 | 8 | 12 | 0 | 4 | 8 | 12 |
| TMPTMA | 10 | 10 | 10 | 10 | 25 | 25 | 25 | 25 |
| MEKP and DTBP | 1 | 1 | 1 | 1 | 1 | 1 | 1 | 1 |
| Results | | | | | | | | |
| liquid/gel/fuse | g | g/f | f | f | g | f | f/g | f |
| React. strength | — | 1 | — | — | — | — | — | — |
| Cracking | 0 | 1 | 0 | 0 | 0 | 0 | 0 | 0 |

TABLE 6-continued

LIQUID MIXTURES 2, FINAL BOTTLE TEST RESULTS-EXAMPLE 1

| Crazing | 0 | 1 | 0 | 0 | 0 | 0 | 0 | 0 |
|---|---|---|---|---|---|---|---|---|
| Color | b | p/w | w | w | y | w/y | p/w | p/w |
| Clear | c | c/t | t | t | c | t/c | c/t | c/t |
| Layers | 1 | 2 | 1 | 1 | 1 | 2 | 2 | 2 |

TABLE 7

LIQUID MIXTURES 3, FINAL BOTTLE TEST RESULTS-EXAMPLE 1

| Constituent weight % | | | | | | | | |
|---|---|---|---|---|---|---|---|---|
| styrene | 59 | 55 | 51 | 47 | 40 | 36 | 32 | 28 |
| polystyrene | 0 | 4 | 8 | 12 | 0 | 4 | 8 | 12 |
| TMPTMA | 40 | 40 | 40 | 40 | 59 | 59 | 59 | 59 |
| MEKP and DTBP | 1 | 1 | 1 | 1 | 1 | 1 | 1 | 1 |
| Results | | | | | | | | |
| liquid/gel/fuse | g | f | f/g | f/g | g | f | f | f/g |
| React. strength | — | — | — | — | — | 1 | — | — |
| Cracking | 0 | 0 | 0 | 0 | 0 | 1 | 2 | 0 |
| Crazing | 5 | 0 | 0 | 0 | 5 | 2 | 0 | 0 |
| Color | b | w/y | y/w | y/w | b | w | w | w/b |
| Clear | c | t/c | c/t | c/t | c | t | t | t/c |
| Layers | 1 | 2 | 2 | 2 | 1 | 1 | 1 | 2 |

Nomenclature for Tables 5-7 is the same as tables 2-4.

Based upon these bottle results and other bottle test results with compositions having other co-monomers catalysts, and curing parameters, liner compositions were selected.

EXAMPLE 2

Based upon the aforementioned bottle tests, aggregate mixtures (i.e., solid component) and a liquid mixtures (i.e., monomer/dissolved polymer component) were prepared and mixed to form a slurry. The solid (Table 8) and liquid (Table 9) component compositions are as follows:

TABLE 8

AGGREGATE MIXTURE-EXAMPLE 2

| Constituent | Aggregate weight % |
|---|---|
| Gradated silica sand, excluding flour | 66.3 |
| Silica flour (less than 0.075 mm average dimensional size) | 9.7 |
| Portland Cement, Class G | 24.0 |

TABLE 9

LIQUID MIXTURE-EXAMPLE 2

| Constituent | Liquid weight % |
|---|---|
| Styrene | 49.0 |
| Polystyrene | 8.0 |
| Trimethylolpropane-trimethacrylate | 37.0 |
| Gamma-methacryloxypropyl-trimethyloxysilane (A-174) | 3.5 |
| Benzoyl peroxide (BPO) | 1.0 |
| Dimethyl aniline (DMA) | 1.0 |
| Methylethylketone peroxide (MEKP) | 0.5 |

The gradation of silica sand was similar to that shown in Table 1. The amount of liquid component in the mixture varied from between 11.5 and 16 percent of the total weight of the slurry for centrifugally cast liner specimens. The liquid constituents listed in Table 9 were added together (including BPO, DMA & MEKP) and mixed prior to adding (pouring onto) to the aggregates designated in Table 8, along with other compositions. The average ambient temperature was roughly 27° C. (80° F.). Using a slurry delivery system primarily based upon gravity flow, the mixture was transferred to the interior of one or more pipe sections. Each pipe section was fitted with slurry containment devices (e.g., fluid dams) at each end. The pipe sections were then spun around the pipe centerline axis. The centrifugal force generated distributed the slurry out against the interior pipe wall, thus forming the fluid barrier which fully lined the interior of the steel pipe. The excess fluid was drained off and the material allowed to gel. Gelation occurred approximately 40 minutes following the mixing of the accelerator in with aggregate slurry.

The test liners fabricated were roughly 1.3-2.5 cm (0.5-1.0 inch) thick and bonded to the interior of pipe sections having nominal diameters of less than 61 cm (24 inches). Fabrication was generally accomplished during summertime ambient conditions.

Sections, including those having the tabulated compositions, were then selected for testing. Some of the sections were oven cured at elevated temperatures; others were allowed to cure at ambient temperature until a test location was made available. The pipe sections were then installed and tested as a part of several geothermal brine pipelines. Brine temperatures of up to 240 degrees Celsius were recorded.

After exposure to the brine for at least several months, the initial test specimens were inspected. Little or no corrosion of the pipe wall was evident, and the lining material was found to be mechanically sound based primarily upon visual inspection. No major failure or significant loss of material was noted.

EXAMPLE 3

An aggregate mixture and a liquid mixture were prepared as per Tables 10 and 11 to fabricate lined pipe test specimens. The process was similar to that described in Example 2. Compositions were as follows:

TABLE 10

AGGREGATE MIXTURE-EXAMPLE 3

| Constituent | Aggregate weight % |
|---|---|
| Gradated silica sand and flour | 70 |
| Processed oil shale | 6 |
| Portland cement, type III | 24 |

TABLE 11

LIQUID MIXTURE-EXAMPLE 3

| Constituent | Aggregate weight % |
|---|---|
| Styrene | 49.4 |
| Polystyrene | 8.0 |
| Trimethylolpropane-trimethacrylate | 38.2 |
| Gamma-methacryloxypropyl-trimethyloxysilane | 2.4 |
| Methylethylketone peroxide (MEKP) | 1.0 |
| Cobalt naphthenate-6% (CON) | 0.5 |
| Di-t-butyl peroxide (DTBP) | 0.5 |

Results prior to exposure to brine were comparable to Example 2 results. No major failures were evident.

EXAMPLE 4

Aggregate and liquid mixtures were prepared as per Tables 12 and 13 to fabricate lined pipe test specimens. The process was similar to Example 2, except the ambient temperature during casting was approximately 100 degree Fahrenheit. Compositions were as follows:

TABLE 12

| AGGREGATE MIXTURE-EXAMPLE 4 | |
| --- | --- |
| Constituent | Aggregate weight % |
| Gradated silica sand (including flour) | 76 |
| Calcium aluminate cement (>40 percent $Al_2O_3$) | 24 |

TABLE 13

| LIQUID MIXTURE-EXAMPLE 4 | |
| --- | --- |
| Constituent | Aggregate weight % |
| Styrene | 81.1 |
| Polystyrene | 7.1 |
| Trimethylolpropane-trimethacrylate | 9.8 |
| Methylethylketone peroxide (MEKP) | 1.0 |
| Cobalt naphthenate-6% (CON) | 0.5 |
| Di-t-butyl peroxide (DTBP) | 0.5 |

Results prior to brine exposure were comparable to Example 2 results. No major failures were evident.

EXAMPLE 5

An aggregate mixture and a liquid mixture component were prepared as per Tables 14 and 15 to fabricate lined pipe test specimens. The process was similar to that described in Example 4. Compositions were as follows:

TABLE 14

| LIQUID MIXTURE-EXAMPLE 5 | |
| --- | --- |
| Constituent | Aggregate weight % |
| Styrene | 53.9 |
| Polystyrene | 7.4 |
| Divinyl benzene | 24.5 |
| Hexadiene | 9.8 |
| Gamma-methacryloxypropyl-trimethyloxysilane | 2.4 |
| Methylethylketone peroxide (MEKP) | 1.0 |
| Cobalt naphthenate-6% (CON) | 0.5 |
| Di-t-butyl peroxide (DTBP) | 0.5 |

TABLE 15

| SOLID AGGREGATE MIXTURE-EXAMPLE 5 | |
| --- | --- |
| Constituent | Aggregate weight % |
| Gradated silica sand (including flour) | 76 |
| Portland cement, Type III | 24 |

Results prior to brine exposure were comparable to Example 2 results. No major failures were evident.

EXAMPLE 6

An aggregate mixture and a liquid mixture were prepared as per Tables 16 and 17 to fabricate lined pipe test specimens. The process was similar to that described in Example 2. The samples were thermally cured at approximately 71° or 93° C. (160° or 200° F.) for a period of 24 hours each. Compositions were as follows:

TABLE 16

| AGGREGATE MIXTURE-EXAMPLE 6 | |
| --- | --- |
| Constituent | Aggregate weight % |
| Gradated silica sand (including flour) | 76 |
| Portland cement, Type III | 24 |

TABLE 17

| LIQUID MIXTURE-EXAMPLE 6 | |
| --- | --- |
| Constituent | Aggregate weight % |
| Styrene | 75.9 |
| Polystyrene | 10.3 |
| Polyvinylmethylsiloxane | 9.9 |
| Gamma-methacryloxypropyl-trimethyloxysilane | 2.4 |
| Benzoyl peroxide (BPO) | 1.0 |
| Di-t-butyl peroxide (DTBP) | 0.5 |

Results prior to brine exposure were comparable to Example 2 results. No major failures were evident.

In all of the previous examples, no water was added. The solid component, if present, was observed to be dry, although some uptake of moisture may have occurred. In addition, at least one of the catalysts (i.e., polymerization additives) is known to be supplied as a water emulsion for safety and handling reasons.

While the preferred embodiment of the invention has been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A composition for forming a solid material comprising:
   an aggregate component comprising a cement material substantially composed of a material which can form a solid binder material when reacted with a minimum quantity of water characterized as a hydrating water; and
   a liquid component comprising a majority ingredient of styrene and a minor ingredient of one or more reactive unsaturates;
   wherein the liquid component contains less than 1.0 percent acrylamide, and wherein the composition contains reacted and free water in an amount less than said hydrating water.

2. The composition of claim 1 wherein:
   said majority ingredient also comprises a dissolved polymer;
   said aggregate component also comprises a filler material; and
   said cement material comprises a substantially inorganic cement.

3. The composition of claim 2 wherein:
   the proportion of said reactive unsaturates is less than 45 percent by weight of said liquid component and said reactive unsaturates are characterized as primarily reactive at two or more hydrocarbon reactive sites; and
   the proportion of said majority ingredient is at least 55 percent by weight of said liquid component.

4. The composition of claim 3 wherein said dissolved polymer consists of a homopolymer of styrene.

5. The composition of claim 4 wherein the amount of said dissolved polystyrene does not exceed 14% by weight of said majority ingredient.

6. The composition of claim 5 wherein said reactive unsaturates are co-monomers selected from the group consisting of compounds having a molecular structure characterized as a poly-olefinic unsaturate.

7. The composition of claim 6 wherein said reactive unsaturates are selected from the group consisting of compounds having a molecular structure characterized by a hydrocarbon containing vinyl type reactive site.

8. The composition of claim 6 wherein said reactive unsaturate group comprises a moiety selected from the group consisting of trimethylolpropane-trimethacrylate, divinyl benzene, hexadiene, and silicone substituted hydrocarbon monomers which contain at least one reactive vinyl group and combinations thereof.

9. The composition of claim 8 wherein said silicone substituted hydrocarbon monomers comprises a moiety selected from the group consisting of polyvinylsiloxane and polyvinyl silane, and combinations thereof.

10. The composition of claim 9 wherein said polyvinylsiloxane comprises polyvinylmethylsiloxane.

11. The composition of claim 8 wherein said liquid component also comprises at least one reactive unsaturate which acts primarily as a coupling agent for said filler material.

12. The composition of claim 11 wherein said coupling agent comprises a vinyl substituted silane.

13. The composition of claim 12 wherein said vinyl substituted silane comprises gamma-methacryloxypropyl-trimethyloxysilane.

14. The composition of claim 13 wherein the proportion of said reactive unsaturates as a weight percent of said liquid component is at least 1 percent of each reactive unsaturate and less than 40 percent trimethylolpropane-trimethacrylate, less than 25 percent divinyl benzene, less than 15 percent of polyvinylmethylsiloxane, less than 15 percent hexadiene. and less than 10 percent gamma-methacryloxypropyl-trimethyloxysilane.

15. The composition of claim 14 wherein said liquid component also comprises a catalyst characterized as a polymerization additive.

16. The composition of claim 15 wherein said polymerization additive comprises a polymerization initiator and a polymerization accelerator.

17. The composition of claim 16 wherein said polymerization initiator is selected from the group consisting of benzoyl, methylethylketone, and di-tertiary-butyl peroxides and combinations thereof.

18. The composition of claim 17 wherein said polymerization accelerator is selected from the group consisting of n,n-dimethylaniline and cobalt naphthenate.

19. The composition of claim 12 wherein the range of constituent proportions of said liquid component as a weight percent of said liquid component are:

| Styrene mixture | 60 to 95% |
| Reactive unsaturate | 5 to 45% |
| Benzoyl peroxide | 0.25 to 3% |
| Dimethyl aniline | 0.25 to 3% |
| Methylethylketone peroxide | 0.25 to 3% |

20. The composition of claim 2 wherein said filler material comprises a mixture of silicious material in the form of particles.

21. The composition of claim 20 wherein said filler material also comprises a pozzolanic material.

22. The composition of claim 21 wherein said pozzolanic material is selected from the group consisting of fuel ash, processed oil shale, and geothermal fluid precipitates.

23. The composition of claim 22 wherein said pozzolanic material is acid washed.

24. The composition of claim 23 wherein said filler material also comprises fibrous shaped materials.

25. The composition of claim 24 wherein said filler material is substantially composed of inorganic material and also comprises a fibrous shaped material composed of a plurality of glass fibers having an average aspect ratio ranging from between 100 to 200.

26. The composition of claim 25 wherein said inorganic cement comprises a Portland cement at a proportion of between 20 and 30 percent by weight of the aggregate component.

27. The composition of claim 25 wherein said inorganic cement comprises a non-shrink cement.

28. The composition of claim 25 wherein said inorganic cement comprises an acid resistant cement.

29. The composition of claim 28 wherein said acid resistant cement comprises a high alumina cement at a proportion of between 20 and 30 percent by weight of the aggregate component.

30. The composition of claim 29 wherein said high alumina cement contains a first quantity of an acid neutralizing agent and wherein said aggregate component also comprises a quantity of an acid neutralizing agent in addition to said first quantity.

31. The composition of claim 20 wherein said silicious material comprises a gradated aggregate mixture having sand particles and a silica flour portion, said silica flour portion having an average particle size of less than 100 microns.

32. The composition of claim 31 wherein the ratio of the amount of said silica flour to the amount of said cement portion of said aggregate component are within a range from 1 part silica flour:8 parts cement ratio to 1 part silica flour:2 parts cement ratio.

33. The composition of claim 32 wherein the remainder of said gradated aggregate mixture has particle sizes generally less than 2.4 mm.

34. The composition of claim 33 wherein said gradated mixture has a bi-modal distribution of particle sizes.

35. A composition for forming a solid material, the composition characterized as a two component mixture which comprises:
  an aggregate component comprising a cement material composed of a substantially dry inorganic material which forms a precipitate after being exposed in water; and
  a substantially waterless liquid component comprising a majority ingredient of a styrene based mixture and a minor ingredient of one or more reactive unsaturates;
  wherein the liquid component contains less than 1.0 percent acrylamide.

36. A composition for forming a polymer concrete solid, said composition comprising a solid component mixture of silicious particles and inorganic cement particles and a liquid component mixture comprising styrene and a reactive unsaturate selected from the group consisting of trimethylolpropane-trimethacrylate, polyvinylsiloxanes, polyvinyl silanes, and combinations thereof, in the absence of significant amounts of free water or acrylonitrile and in the absence of 1.0 percent or more of acrylamide.

37. A composition for forming a polymer concrete solid, said composition comprising a solid component having a mixture of silicious particles and inorganic cement particles and a liquid component mixture comprising styrene and a reactive unsaturate selected from the group consisting of divinyl benzene, hexadiene, and combinations thereof, in the absence of significant amounts of free water or acrylonitrile and in the absence of 1.0 percent or more of acrylamide.

38. A composition for forming a solid material, the composition consisting essentially of:
- an aggregate composed of incompletely hydrated material which forms a more fully hydrated material when exposed to a quantity of water characterized as hydrating water; and
- a polymerizable liquid composed of a major proportion of a styrene based mixture and a minor proportion of one or more unsaturates, wherein said composition contains water in an amount less than said hydrating water, wherein said polymerizable liquid contains less than 1.0 percent acrylamide.

39. A composition for forming a solid material, the composition consisting essentially of:
- a first aggregate portion composed of incompletely hydrated material which forms a more fully hydrated material when exposed to a quantity of water characterized as hydrating water;
- a second aggregate portion composed of one or more filler materials; and
- a polymerizable liquid composed of a major proportion of a styrene based mixture, a first minor proportion of one or more unsaturates in the absence of a 1.0 percent or more of acrylamide and a significant amount of acrylonitrile, and a second minor portion of water significantly less than said hydrating water quantity.

40. A composition for forming a solid material comprising:
- an aggregate component comprising a cement material;
- a liquid component comprising a majority ingredient of styrene and a minor ingredient of one or more reactive unsaturates; and
- wherein the liquid component contains less than 1.0 percent acrylamide.

41. A composition for forming a solid material comprising:
- an aggregate component comprising a cement material substantially composed of a material which can form a solid binder material when reacted with a minimum quantity of water characterized as a hydrating water;
- a liquid component comprising a majority ingredient of styrene and a minor ingredient of one or more reactive unsaturates; and
- wherein the liquid component contains less than 1.0 percent acrylamide, and wherein the composition contains reacted and free water in an amount less than said hydrating water.

* * * * *